(12) United States Patent
Stegelmann (10) Patent No.: US 7,754,141 B2
(45) Date of Patent: Jul. 13, 2010

(54) BI-MATERIAL ULTRASONIC HORN WITH INTEGRAL ISOLATION MEMBER

(75) Inventor: Norman R. Stegelmann, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 2 days.

(21) Appl. No.: 12/321,388

(22) Filed: Jan. 21, 2009

(65) Prior Publication Data

US 2009/0129965 A1 May 21, 2009

Related U.S. Application Data

(62) Division of application No. 11/297,289, filed on Dec. 7, 2005, now abandoned.

(51) Int. Cl.
*B22F 1/00* (2006.01)

(52) U.S. Cl. .......................................... 419/42; 419/38

(58) Field of Classification Search .................. 228/1.1, 228/110.1; 419/8, 38, 42
See application file for complete search history.

(56) References Cited

U.S. PATENT DOCUMENTS

| 5,087,320 | A | 2/1992 | Neuwirth |
| 5,096,532 | A | 3/1992 | Neuwirth et al. |
| 5,110,403 | A | 5/1992 | Ehlert |
| 5,552,013 | A | 9/1996 | Ehlert et al. |
| 6,613,171 | B2 * | 9/2003 | McNichols et al. ........ 156/73.1 |
| 6,758,925 | B1 * | 7/2004 | Stegelmann ............... 156/73.1 |
| 6,767,420 | B2 | 7/2004 | Stegelmann |
| 6,786,383 | B2 | 9/2004 | Stegelmann |
| 6,841,921 | B2 | 1/2005 | Stegelmann |
| 2004/0118524 | A1 | 6/2004 | Stegelmann |
| 2007/0125829 | A1 | 6/2007 | Stegelmann |

\* cited by examiner

*Primary Examiner*—Jessica L. Ward
*Assistant Examiner*—Megha Mehta
(74) *Attorney, Agent, or Firm*—John L. Brodersen (57) ABSTRACT

Disclosed is a method for manufacturing an ultrasonic horn for transporting ultrasonic energy to an operating location.

11 Claims, 5 Drawing Sheets

BI-MATERIAL ULTRASONIC HORN WITH INTEGRAL ISOLATION MEMBER

CLAIM FOR PRIORITY

This application is a divisional of prior application Ser. No. 11/297,289, filed Dec. 7, 2005 now abandoned.

BACKGROUND OF INVENTION

This invention relates to an ultrasonic horn for use in manufacturing operations such as bonding, perforation, and cutting. More specifically the invention relates to an ultrasonic horn that includes an integral isolation member.

Ultrasonic horns are used to distribute ultrasonic energy in a variety of industrial processes. One example involves bonding of two thermoplastic sheets of material together in the manufacture of personal care products such as diapers.

Ultrasonic horn systems can have a number of distinct components, which can be connected in a stack. In one arrangement, these components may include a power excitation device known as a converter (or driver assembly), amplitude modification devices known as boosters, and an ultrasonically energized tool known as an ultrasonic horn, at least a portion of which imparts ultrasonic energy to a work piece. In addition, the ultrasonic horn can include isolation members that can be configured for mounting the horn at a work (i.e., bonding) location.

Generally, horns have been manufactured by machining a final horn shape from forged bar stock, such as titanium bar stock. Alternatively, horns can be manufactured by way of machining the horn from a hot isostatically pressed preform for improved performance.

Unfortunately, in certain circumstances, such horns may not always be completely satisfactory. For example, even in the case of hot isostatic pressing, machining the horn from the base piece of material can result in a certain amount of potentially costly material that must be machined into the desired shape. Moreover, since the ultrasonic horn is typically manufactured from a material that can transport or transmit ultrasonic energy in a highly efficient manner, isolation members that are also of that same material may not function completely as desired. In particular, the isolation member in such circumstances may be more susceptible to higher noise transmission and potentially undesirably heating of the mounting element that it is joined to (e.g., a bearing).

Thus there is a need for an ultrasonic horn that is provided by a material that efficiently transports ultrasonic energy but yet includes an isolation member that is at least partially of a different material, suitably a material that is less efficient at transporting ultrasonic energy. In addition, there is a need for an ultrasonic horn that can be provided by a method that results in an effective ultrasonic horn but with reduced material waste.

SUMMARY OF THE INVENTION

In one aspect, the present invention is directed to an ultrasonic horn for transporting ultrasonic energy to an operating location defining a radial direction and an axial direction. The ultrasonic horn includes a horn member and an energy transfer surface disposed on the horn member. The ultrasonic horn also includes an axle member joined to the horn member where the axle member is provided by a first material. The ultrasonic horn further includes an isolation member integrally joined to the axle member and adapted for mounting the ultrasonic horn at a work location where at least a portion of the isolation member is provided by a second material.

In another aspect, the present invention is directed to an ultrasonic horn for transporting ultrasonic energy to an operating location defining a radial direction and an axial direction. The ultrasonic horn includes a horn member, an energy transfer surface disposed on the horn member and an axle member joined to the horn member. The ultrasonic horn also includes an isolation member integrally joined to the axle member and adapted for mounting the ultrasonic horn at a work location. In addition, the axle member can be configured to transport ultrasonic energy at least 200% more efficiently than at least a portion of the isolation member.

In yet another aspect, the present invention is directed to an ultrasonic horn for transporting ultrasonic energy to an operating location defining a radial direction and an axial direction. The ultrasonic horn includes a horn member, an energy transfer surface disposed on the horn member, and an axle member joined to the horn member. The ultrasonic horn also includes an isolation member integrally joined to the axle member adapted for mounting the ultrasonic horn at a work location wherein at least a portion of the isolation member is acoustically decoupled from the axle member.

In still yet another aspect, the present invention is directed to a method for manufacturing an ultrasonic horn. The method includes forming metal powder into a horn body perform within a preform mold and hot isostatically pressing the horn body preform to consolidate the metal powder to form a compressed horn preform shape. The compressed horn preform shape can have a uniform isotropic microstructure characterized by randomly isotropic directional grain alignment wherein at least a portion of the ultrasonic horn is provided by the preform mold.

The above-mentioned and other aspects of the present invention will become more apparent, and the invention itself will be better understood by reference to the drawings and the following description of the drawings.

DEFINITIONS

"Attach" and its derivatives refer to the joining, adhering, connecting or the like, of two elements. Two elements will be considered to be attached together when they are attached directly to one another or indirectly to one another, such as when each is directly attached to intermediate elements, or when they are integrally or non-integrally attached to each other.

The terms "Bond" and "Weld" and their derivatives may be used interchangeably, and refer to the substantially permanent joining of at least one layer of a material with another layer of a like or different material. The nature of the materials to be bonded is not known to be critical. However, the present invention is particularly useful in the bonding of two or more layers of materials, such as woven fabrics, nonwoven fabrics, and films.

The terms "disposed on," "disposed along," "disposed with," or "disposed toward" and variations thereof are intended to mean that one element can be integral with another element, or that one element can be a separate structure bonded to or placed with or placed near another element.

The term "Fabric" is used broadly in the present disclosure to mean a sheet or web of a woven or nonwoven fibrous material. The fabric or film layer may be continuous, as in a roll, or may be discontinuous.

"Integral" and its derivatives refer to the nature of an attachment, connection, joinder or the like of two elements where the connection, joinder, or attachment is not enabled by way of a fastener (i.e., a bolt) welding or the like, and there is no macroscopic seam between the two elements.

"Join" and its derivatives refer to the connecting, adhering, attaching or the like, of two elements. Two elements will be considered to be joined together when they are joined directly to one another or indirectly to one another, such as when each is directly joined to intermediate elements or when they are integrally or non-integrally joined to each other.

"Layer" when used in the singular can have the dual meaning of a single element or a plurality of elements.

"Member" when used in the singular can have the dual meaning of a single element or a plurality of elements.

These terms may be defined with additional language in the remaining portions of the specification.

DETAILED DESCRIPTION OF THE INVENTION

Figure 1:
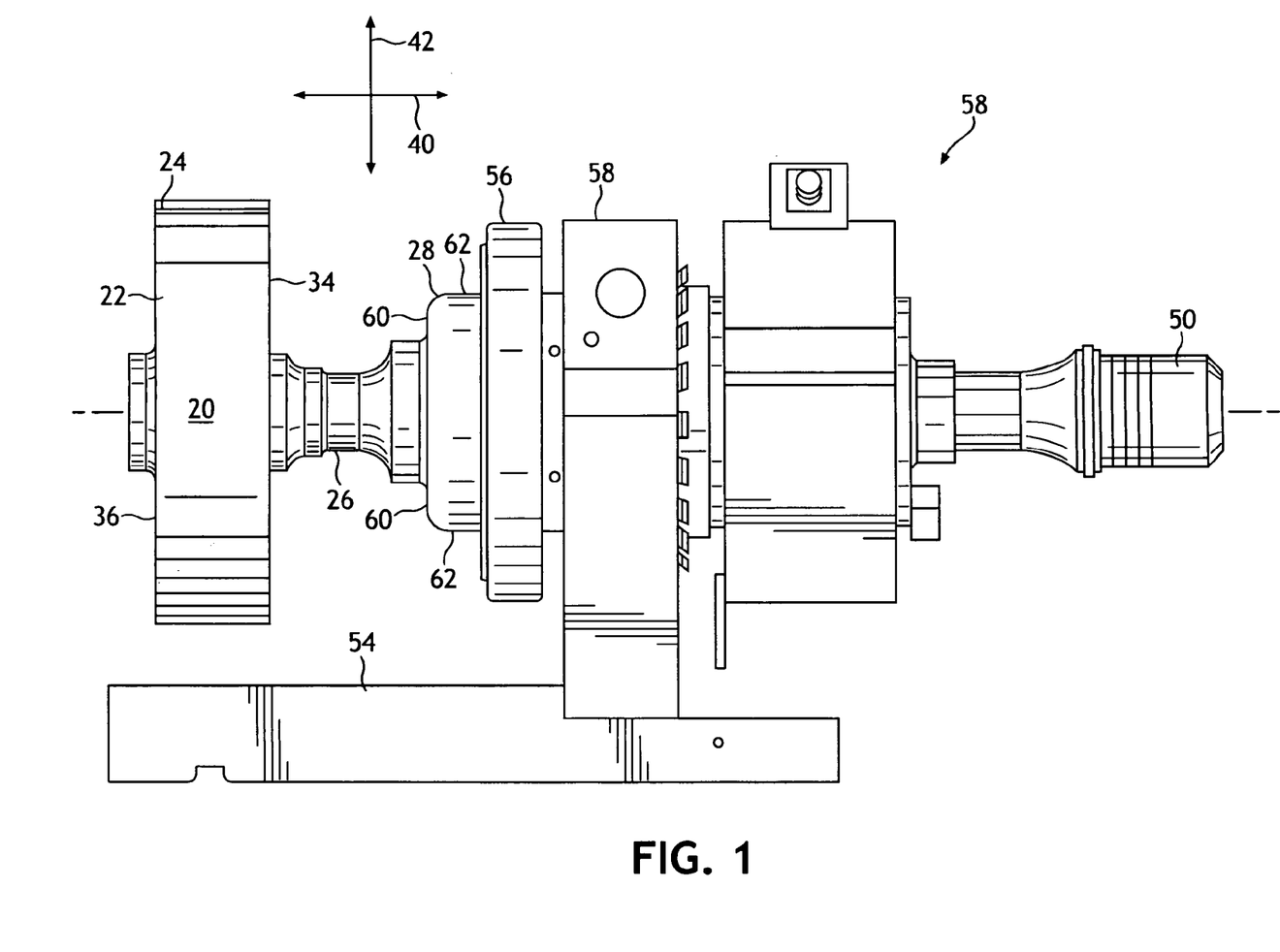
FIG. 1 representatively illustrates a side view of a representative ultrasonic horn system including an ultrasonic horn of the present invention.

Referring now to the drawings, and in particular to FIG. 1, an ultrasonic horn system is representatively illustrated and indicated in its entirety by the reference numeral 18. The ultrasonic horn system 18 includes an ultrasonic horn 20 of the present invention. In general, the ultrasonic horn 20 can be configured to transport ultrasonic energy to an operating location. In particular, the ultrasonic horn 20 of the present invention will be described in terms of a rotary ultrasonic horn that is configured to ultrasonically bond two or more layers together. Nonetheless, it should also be understood that the present invention can be suitable for use with other applications such as ultrasonic horns configured for plunge bonding, atomizing liquids, perforating, cutting and the like or combinations thereof.

By way of illustration only, various materials, methods, and applications for ultrasonic horns such as the ultrasonic horn 20 of the present invention are disclosed in U.S. Pat. No. 5,096,532 entitled ULTRASONIC ROTARY HORN by Joseph G. Neuwirth et al. which issued Mar. 17, 1992; U.S. Pat. No. 5,110,403 entitled HIGH EFFICIENCY ULTRASONIC ROTARY HORN by Thomas D. Ehlert et al. which issued May 5, 1992; and in U.S. Pat. No. 5,087,320 entitled ULTRASONIC ROTARY HORN HAVING IMPROVED END CONFIGURATION by Joseph G. Neuwirth which issued Feb. 11, 1992. The entirety of each of these documents is incorporated herein by reference, in a manner that is consistent herewith.

Figure 2:
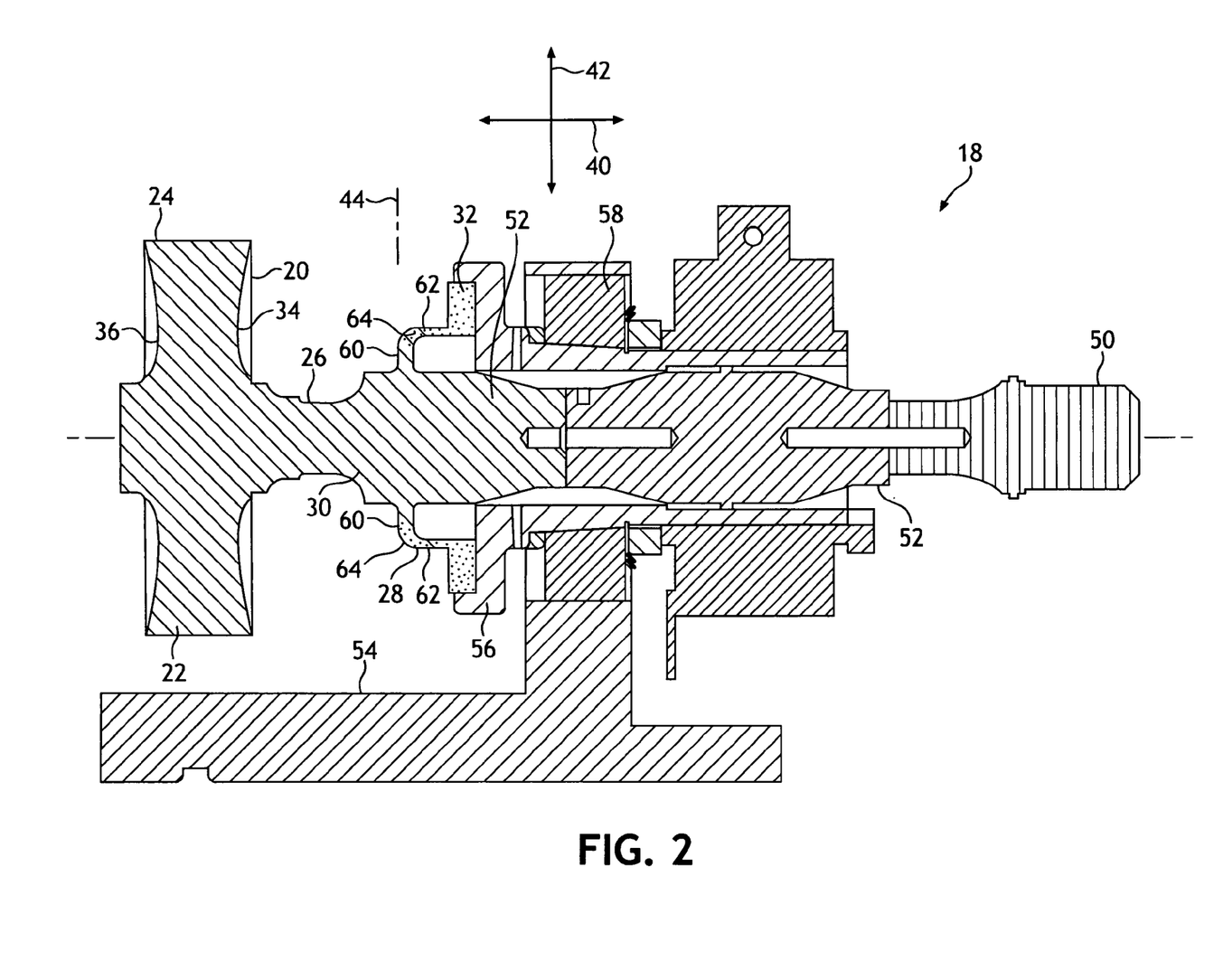
FIG. 2 representatively illustrates a cross-section through the ultrasonic horn system of FIG. 1.
Figure 4:
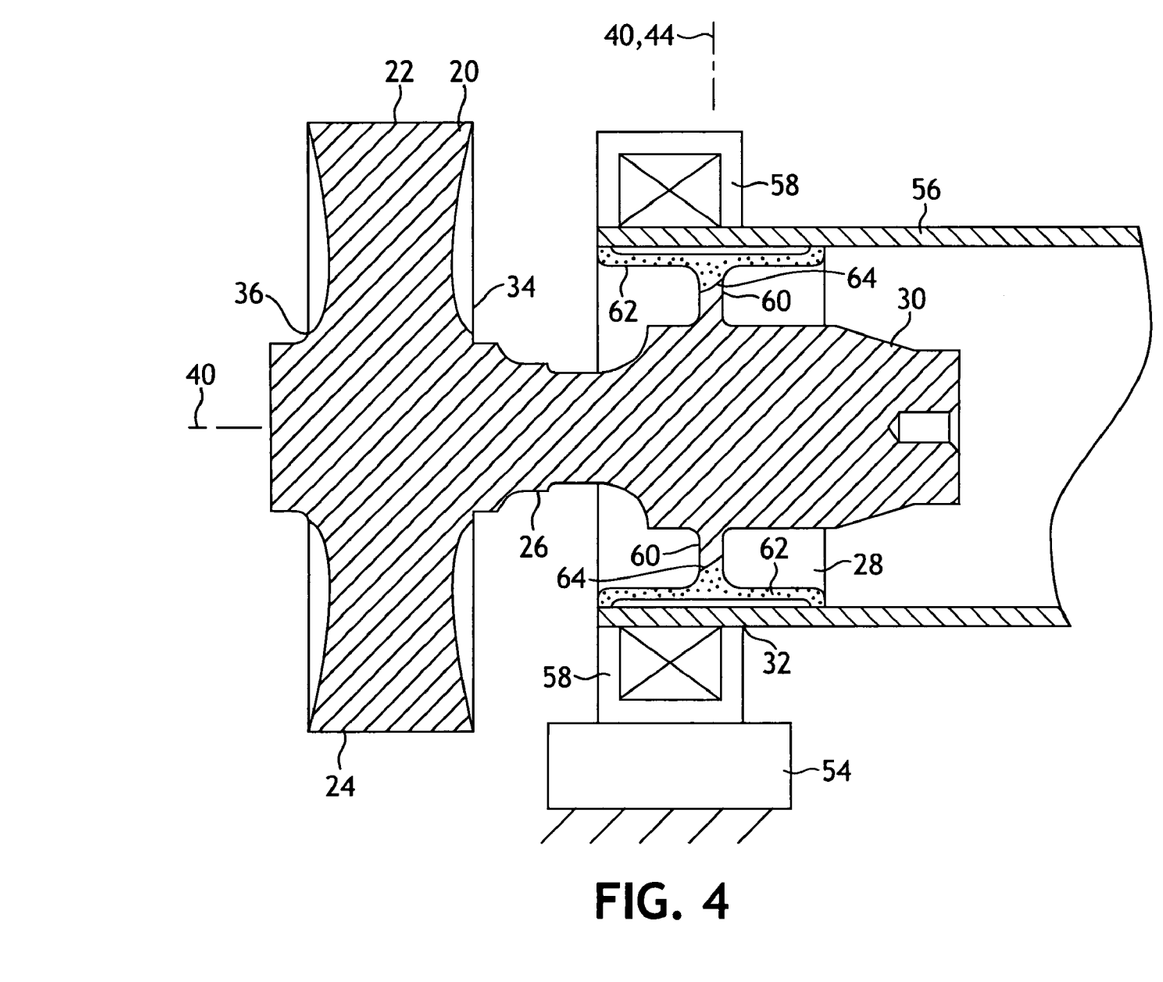
FIG. 4 representatively illustrates a side view of a cross-section through a mounted configuration of the ultrasonic horn of FIG. 3.

The ultrasonic horn 20 of the present invention can be a shaped metal horn that defines an axial direction 40 and a radial direction 42 perpendicular to the axial direction 40 as shown in FIGS. 1, 2 and 4. In the illustrated embodiments, the ultrasonic horn 20 can include a generally circular, disk-shaped horn member 22 having an outer peripheral surface that can be substantially continuous. Alternatively, the horn member may have a non-circular shape and/or the outer peripheral surface of the horn member may have a discontinuous configuration. The horn member 22 can have a first face 34 and a second face 36 opposite the first face 34. The horn member 22 can further include an energy transfer surface 24 that is configured to impart the ultrasonic energy to the work piece disposed on the horn member 22. In the illustrated aspects, the energy transfer surface 24 is the outer peripheral surface of the horn member 22.

The ultrasonic horn 20 can also include an axle member 26 about which the ultrasonic horn 22 can rotate. As representatively illustrated in FIG. 1-5, the axle member 26 can extend from first face 34 of the horn member 22 in the axial direction 40. In a particular aspect, the axle member 26 can extend substantially perpendicularly from the first face 34.

Further, as representatively illustrated in FIGS. 1-5, the ultrasonic horn 20 of the present invention includes an isolation member 28 adapted for mounting the ultrasonic horn 20 at a work location. As will be described in greater detail below, the isolation member 28 can suitably be integrally joined to the axle member 26.

Variables such as the diameter, mass, width, thickness and configuration of the ultrasonic horn 20 are not narrowly critical to the present invention. Nonetheless, as will be understood by those of skill in the art, the variables do determine the particular frequency and amplitude at which the ultrasonic horn resonates and vibrates. In particular, the physical variables of an ultrasonic horn, such as diameter, mass, thickness, overall configuration, etc. may be selected such that the device resonates in a desired mode, i.e., a fundamental resonant mode under a given set of conditions, at a particular frequency and with a desired amplitude. For example, it is known that vibration in the desired mode at a desired frequency is achieved by adjusting physical parameters, and it is known that gain, i.e., ratio of output amplitude to input amplitude, can also be adjusted by adjusting physical parameters.

Thus, in one aspect, the ultrasonic horn 20 can have a diameter of from about 4 to about 20 centimeters and a width at the energy transfer surface 24 of from about 0.6 to about 13 centimeters. The thickness of the horn at the axle member 26 may be from about 0.06 to about 15 centimeters. The ultrasonic horn 20 can have a mass in the range of from about 0.06 to about 30 kilograms.

As mentioned above, the ultrasonic horn 20 can be configured such that the horn, upon being excited by ultrasonic energy at a desired frequency, is adapted to resonate such that the excited end moves substantially in phase with the movement of the source of excitation. That is, the opposed end of ultrasonic horn 20 and the energy transfer surface 24 move substantially out of phase with the excited end. Thus, upon subjecting the ultrasonic horn 20 to ultrasonic excitation, the excited end moves in a direction towards the interior of the horn while the opposing end and the energy transfer surface 24 move in the opposite direction which is also towards the interior of the horn. As such, the movements of the ends of the horn relative to each other are said to be out of phase. In a particular aspect, the ultrasonic horn 20 can be intended to be excited at a frequency of from about 15 to about 60 kHz.

In addition to the ultrasonic horn 20, the ultrasonic horn system 18 can also include a number of components assembled into a stack. The various components of the ultrasonic horn system can be assembled by methods known in the art. For example, the components can be integrally joined or may be joined by connectors, or a combination thereof. In one aspect these connectors can be studs of the type disclosed in U.S. Pat. No. 6,841,921 issued Jan. 11, 2005, in the name of Stegelmann, the disclosure of which is incorporated herein by reference to the extent that it is consistent (i.e., not in conflict) herewith. Alternatively, the various components of the ultrasonic horn system 18 can be fused into a stack as disclosed in U.S. Pat. No. 6,786,383 issued Sep. 7, 2004, in the name of Stegelmann the disclosure of which is incorporated herein by reference to the extent that it is consistent (i.e., not in conflict) herewith.

For example, as representatively illustrated in FIGS. 1-2, the system 18 can include a drive mechanism or converter 50 to ultrasonically excite the ultrasonic horn 20. Any mechanism which provides the desired excitation can be used in connection with the present invention. Such mechanisms are well known to those skilled in the art. For example, the system can include a drive mechanism that is commercially available from Dukane Corporation located in St. Charles, Ill. or a similar system available from Branson Sonic Power Company located in Danbury, Conn. Typically, a generator, such as a Dukane 3000 watt, 20 kHz generator (Part No. 20A3005), is connected to a driver assembly, such as a Dukane driver assembly (Part No. 110-3716-0001), to provide the necessary ultrasonic excitation.

Figure 3:
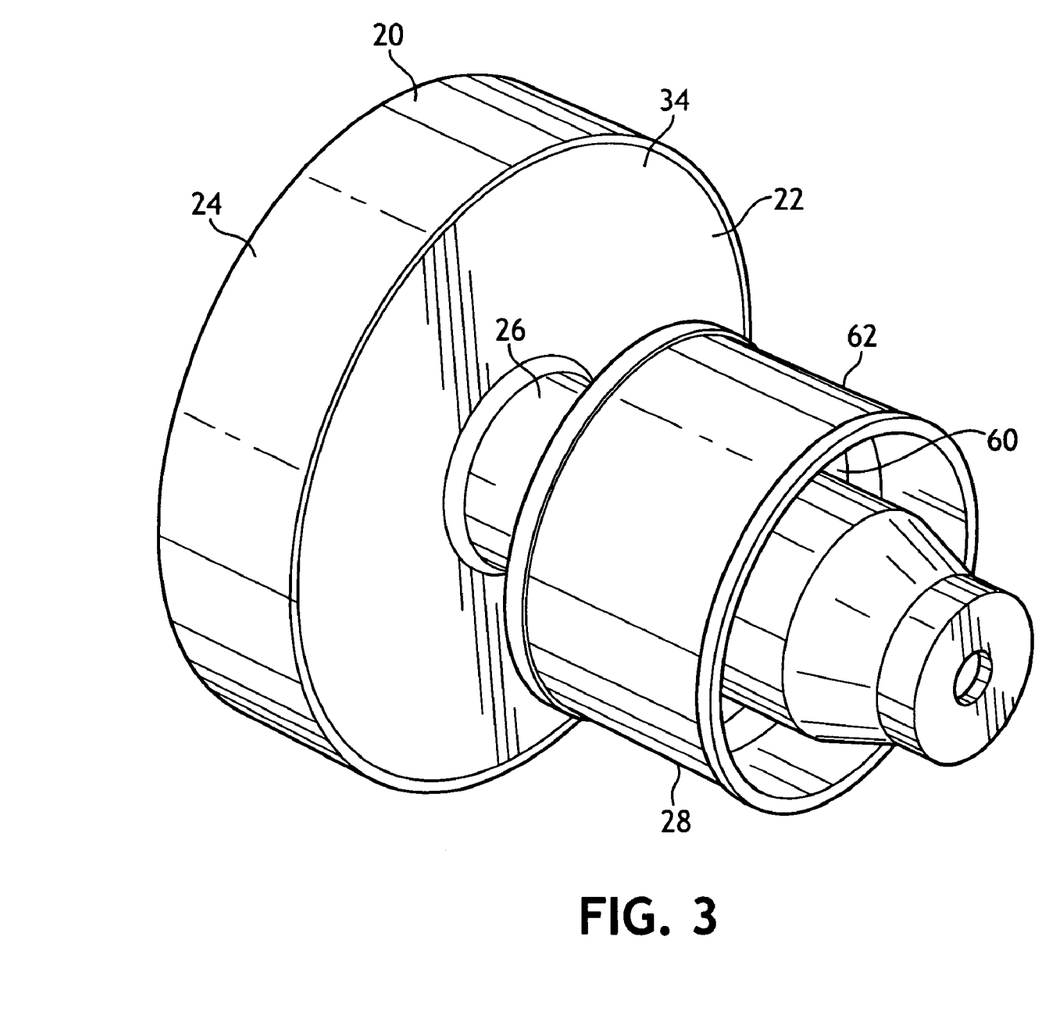
FIG. 3 representatively illustrates a perspective view of another ultrasonic horn of the present invention.

As representatively illustrated in FIGS. 2-4, the system 18 can also optionally include one or more boosters 52 to adjust the gain of the ultrasonic energy being transferred to the horn 20 from the converter 50. Boosters can be provided by a portion of the axle member 34, or alternatively, a separate booster 52 can be attached to the axle member 26. Examples of boosters 52 that can be suitable for use in connection with the present invention include a Dukane 1:1 booster (Part No. 110-2510) and a Dukane 1.5:1 booster (Part No. 110-2512). The combination of the converter 50 and the boosters 52 ultrasonically excites the ultrasonic horn 20, to thereby deliver the ultrasonic energy necessary to bond the substrate webs together, perforate a substrate, or otherwise carry out the desired operation.

The system 18 can further include a drive (not shown) to spin the horn about the axle member 26. Suitable driving systems can include take-offs from a powered line shaft, motors, engines, electric motors or the like, as well as combinations thereof.

The system 18 can also include an anvil (not shown) with which the horn acts, with the work piece therebetween. The anvil may be a stationary anvil, or may optionally be a rotating anvil roll as in the case of a rotating ultrasonic horn as described in U.S. Pat. Nos. 5,087,320, 5,096,532, 5,110,403, and 5,552,013 (all hereby incorporated by reference). The rotating anvil roll has an outer peripheral anvil surface located adjacent the energy transfer surface 24 of the horn 20. The anvil roll can be configured to counter-rotate with the ultrasonic horn 20, and in one specific bonding operation, substrate webs continuously move between the energy transfer face of the horn and the anvil.

A desired bonding pattern or other selected processing mechanism can be provided on the outer peripheral surface of the rotary anvil member and/or can be provided on the energy transfer surface 24 of the horn member 22, as desired. The bonding pattern can be composed of a plurality of bonding elements that are configured to project substantially radially away from the energy transfer surface 24 in a manner that is well known in the art. The bonding elements can be discontinuously or substantially continuously distributed in a regular or irregular array across the outer peripheral surface of the anvil member and/or the energy transfer surface 24 of the horn member 22.

As representatively shown in FIGS. 1, 2 and 4, the isolation member 28 can be configured to mount the ultrasonic horn 20 at a work location such as to a mounting structure such as a frame 54. For example, the isolation member 28 can be joined to a rotatable coupler 56 which, in turn, can be supported by at least one rotational bearing 58 and an associated frame 54. The isolation member 28 can be attached to the coupler by an interference, friction-fit (FIG. 4). Alternatively, or in addition, fasteners may be used to hold the isolation member 28 in place. Isolation members suitable for use in connection with the present invention are described in U.S. Pat. No. 6,613,171 issued Sep. 2, 2003 in the name of Blenke, et al., the disclosure of which is incorporated herein by reference to the extent that it is consistent (i.e., not in conflict) herewith.

The first isolation member 28 can suitably exhibit high rigidity and stiffness. In a particular aspect, the isolation member 28 is capable of dynamically flexing and bending under a horn-life range of sonic frequencies to provide an operative component of motion along the radial direction 42. In addition, the isolation member 28 can provide an operative component of motion along the axial direction 40.

In a particular aspect, the isolation member 28 can have a radial isolation submember 60 and an axial isolation submember 62. The radial isolation submember 62 can be integrally joined to the axle member 26, and can be configured to extend at least, substantially radially from the axle member 26. The radial isolation submember 60 can be configured to operatively flex and bend under the horn-life range of sonic frequencies. Additionally, the radial isolation submember 60 can dynamically bend to provide transverse displacements that are directed along a thickness dimension of the radial isolation submember 60. Accordingly, a dynamic bending of the radial isolation submember 60 can swing generally along the axial direction 40.

In addition, the isolation member can also include an axial isolation submember 62. The axial isolation submember 62 can be integrally joined to the radial isolation submember 60, and can be configured to extend in at least the axial direction from the radial isolation submember 60. The axial isolation submember 62 can be configured to operatively flex and bend under the horn-life range of sonic frequencies. Additionally, the axial isolation submember 62 can dynamically bend to provide transverse displacements that are directed along a thickness dimension of the axial isolation submember 62. Accordingly, a dynamic bending of the axial isolation submember 62 can swing generally along the radial direction 42.

The radial isolation submember 60 can extend discontinuously or substantially continuously circumferentially about the axle member 26. As representatively illustrated in FIGS. 1-4, the radial isolation submember 60 can be substantially disk-shaped, or alternatively, can be substantially annular-shaped.

The axial isolation submember 62 can be configured to provide a discontinuous or a substantially continuous extension in the axial direction 40 from the radial isolation submember 60. Additionally, the axial isolation submember 62 can be configured to extend discontinuously, or substantially continuously about the radial isolation submember 60. For example, as representatively illustrated in FIGS. 1-4, the axial isolation submember 62 can be substantially cylinder-shaped.

As mentioned above, the isolation member 28 can be configured to have high stiffness and rigidity, thereby providing an ultrasonic horn 20 that can suitably operate in a fixed-gap arrangement. Specifically, in one aspect, the ultrasonic horn 20 can be configured, when mounted at a work location, to exhibit a static deflection of about 0.004 mm (about 0.00015 inch), or less, when subjected to a static force of 445 N (100 lb) which is directed onto the energy transfer surface 24 of the horn member 22 at a location that is centered along the axial dimension of the energy transfer surface 24, and along the radial direction 42. In particular aspects, the static deflection can alternatively be about 0.002 mm or less, and can optionally be 0.001 mm or less. In other aspects, the static deflection of the ultrasonic horn 20 can be not more than a maximum of about 0.075 mm. The static deflection can alternatively be not more than about 0.05 mm, and optionally, can be not more than about 0.01 mm to provide further improved performance.

In other aspects, the ultrasonic horn 20 can include a node plane, indicated at the line marked 44. In a particular aspect, the node plane 44 can be located along the axle member 26, generally perpendicular to the axial direction 40. Suitably, the isolation member 28 can be integrally joined to the axle member 26 proximate the node plane 44. For the present disclosure, the node plane 44 of the ultrasonic horn 20 is an axial node located along the axial direction 40. At the node plane 44, approximately zero displacements in the axial direction 40 are present during ordinary operation with the selected ultrasonic excitations. Displacements in the radial direction 42, however, can continue to occur at the node plane 44. Accordingly, in such an aspect, the isolation member 28 can provide a more stable mounting mechanism for the horn 20.

The ultrasonic horn 20 can be made from any material or combination of materials having the desired acoustical and mechanical properties. For example, certain portions of the ultrasonic horn 20 can be provided by a first material 30. Suitable metals can include aluminum, monel, titanium, alloy steels or combinations thereof. In a particular aspect, the first material can be suitably provided by a titanium-based material, such commercially pure titanium, or a titanium alloy (e.g., Ti6Al4V). Specifically, at least the axle member 26, and optionally other portions of the ultrasonic horn 20, such as the horn member 22, can be provided by the first material 30.

The ultrasonic horn 20 can also include a second material 32 different than the first material 30. The second material 32 can suitably be less acoustic than the first material 30. That is, in certain aspects, the second material 32 can transport acoustic energy less efficiently than the first material 30. Suitable metals for the second material 32 can include aluminum, monel, titanium, alloy steels or combinations thereof. In a particular aspect, the second material 32 can be steel or a steel alloy. Specifically, at least a portion of the isolation member 28 can be provided by a second material 32.

Accordingly, the first material 30 and the second material 32 can exhibit different properties for transporting ultrasonic energy. In one aspect, the first material 30 can transport ultrasonic energy at least 100 percent more efficiently than the second material 32. In another aspect, the first material 30 can suitably transport ultrasonic energy at least 200 percent more efficiently than the second material 32, and still more suitably at least 500 percent more efficiently. As such, portions of the ultrasonic horn 20, such as the axle member 26, can be configured to transport ultrasonic energy at least 100 percent more efficiently than at least a portion of the isolation member 28, suitably 200 percent more efficiently, and still more suitably 500 percent more efficiently.

For example, the radial isolation submember 60 can be provided at least in part by the first material 30. Optionally, the radial isolation submember 60 can be provided substantially by the first material 30. Moreover, the axial isolation submember 62 can be provided at least in part by the second material 32. The isolation member 28 can also include a mixture zone 64 where there can be diffusion between the first material 30 and the second material 32 on a molecular level. Accordingly, the mixture zone 64 can include the first material 30 intermixed with the second material 32. In a particular aspect, the mixture zone can be disposed proximate the axle member 26.

In such an arrangement, at least a portion of the isolation member 28 can be acoustically decoupled from the axle member 26. That is, at least a portion of the isolation member 28 does not vibrate in the same mode as the axle member 26 when the ultrasonic horn 20 is subjected to ultrasonic excitation, and in certain circumstances, may not vibrate at all when subjected to ultrasonic excitation. In a particular aspect, the axial isolation submember 62 can be acoustically decoupled from the axle member 26.

Accordingly, configuring the isolation member 28 in this manner provides several advantages. For instance, the isolation member 28 will suitably transfer a reduced amount of vibration to the coupler 56. Accordingly, this can advantageously decrease noise associated with the ultrasonic horn 20, improve performance due to the lower vibration and improve the mounting of the horn 20. Moreover, equipment life of both the horn 20 and the coupler 56 can be improved.

This bi-material arrangement in the ultrasonic horn 20 can be achieved by way of a hot-isostatic pressing (HIP) preform approach. HIP casting of ultrasonic horns is disclosed in U.S. Pat. No. 6,767,420, issued Jul. 27, 2004 to Stegelmann, the disclosure of which is incorporated herein by reference to the extent that it is consistent (i.e., not in conflict) herewith.

Figure 5:
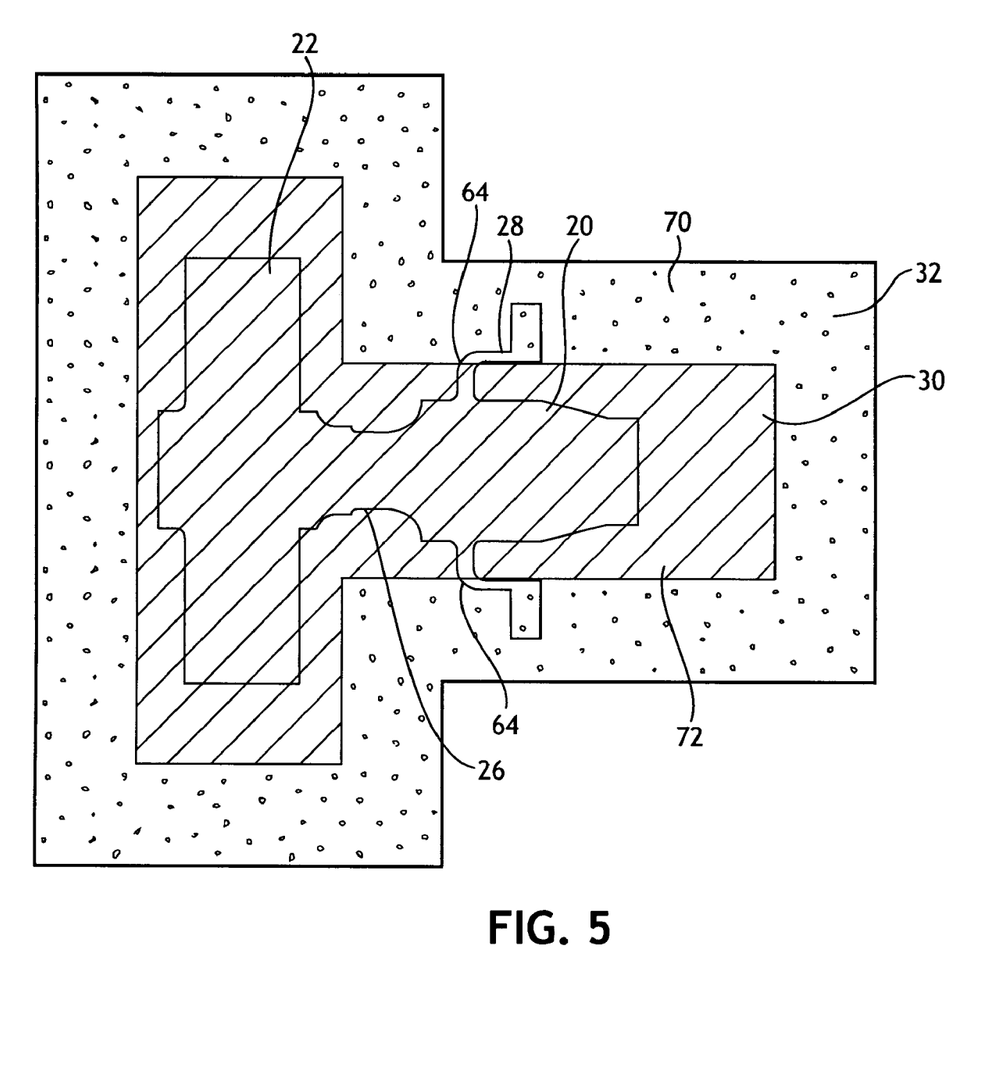
FIG. 5 representatively illustrates a cross-section of a hot isostatic press casing that can be used in connection with making the ultrasonic horn illustrated in FIG. 1.

HIP casting of an ultrasonic horn is a powder metallurgical process in which metal powder is formed into a horn preform shape 72 by filling the powder into a preform mold 70, representatively illustrated in FIG. 5, and then consolidated by HIP process, also known as HIP-consolidation. The powder can be a titanium-based material, such commercially pure titanium or a titanium alloy (e.g., Ti6Al4V), as mentioned above. The perform mold 70 can be steel or a steel alloy such as a 1020 mild steel or any other suitable mild structural steel. As can be seen in FIG. 5, the metal powder in the horn preform shape 72 can provide the first material 30 and the material of the preform mold 70 can likewise provide the second material 32.

After filling the powder into the ultrasonic rotary horn preform mold 72, the preform is hot isostatically pressed to consolidate and compress the metal powder. The hot isostatic pressing operation can be carried out employing a pressure vessel which can be pressurized employing a gas, such as argon, of commercial quality to apply a pressure equally over the entire surface area of the horn body. The pressure, in combination with the elevated temperature employed, effects consolidation of the metal powder to a density of at least about 95%, at least about 99%, and even about 100% of the theoretical density of the metal.

For the hot isostatic pressing, a pressure suitable for use in this operation can be, for example, about 16 ksi. The temperature employed in this operation can be in the range of about 1500 F. (about 815 C.) to about 1600 F. (about 870 C.). The duration of the hot isostatic pressing step depends upon the temperature and pressure selected. As a general proposition, when the pressure is 16 ksi and the temperature is in the range of about 1500 F. (about 815 C.) to about 1600 F. (about 870 C), the process may employ a time period of about 1.5 hrs to about 3 hrs, for example 2 hrs, in one embodiment. At the conclusion of the hot isostatic pressing step, the preform mold 70 and the compressed preform shape 72 are cooled and removed from the pressure vessel. The mold 70 and the isostatically pressed shape 72 are then subjected to final machining operations to impart the desired final shape and surface characteristics to provide the ultrasonic horn 20. Specifically, at least a portion of the isolation member 28 can be provided by the mold 70 (as described above), while the remainder of the horn 20 can be provided by the pressed shape 72. In addition to the advantages described above, the preform shape 72 can be more closely tailored to the geometry of the horn 20 when a portion of the horn, such as the isolation member 28, is provided by the mold 70. As such, a lower amount of the preform shape 72 must be cut away and discarded.

As a result of the HIP process, the ultrasonic horn 20 microstructure is characterized by a random alignment of grains, which is isotropic in that there is no preferential alignment in any direction or directions. As such the horn body uniformly expands and contracts in all radial directions upon excitation at an operating frequency such as, for example, an operating frequency between about 15 and about 60 kHz. Ultrasonic horns featuring such uniform grain structure and the advantages thereof are further described in the previously incorporated U.S. Pat. No. 6,767,420.

For example, the ultrasonic horn 20, and particularly the horn member 22 can feature a substantially uniform expansion and contraction amplitude upon excitation at an operating frequency. In one aspect the expansion and contraction is at least about 80% uniform in that the minimum amplitude of expansion and contraction in any direction is at least about 80% of the maximum amplitude of expansion and contraction in any direction. In another aspect the expansion and contraction amplitude is at least about 90% uniform, and in another embodiment it is at least about 95% uniform. In particular, for example, the variation in amplitude of the expansion and contraction measured along the energy transfer surface 24 is less than about 10% of the maximum amplitude at any point on the energy transfer surface 24. More specifically, for example, if the maximum amplitude is A-max where A-max is a value between about 0.002 inches (0.005 cms) and about 0.008 inches (0.020 cms), the difference between the maximum amplitude and the minimum amplitude is less than about 0.1 times (A-max).

The isolation member 28 can also provide improved stiffness to reduce deflections under load. The increased stiffness can help maintain concentricity, and help to reduce run-out displacements at the energy transfer surface 24 of the horn member 22. Additionally, the isolation member 28 can more efficiently transmit torque to the ultrasonic horn 20, and can provide improved effectiveness and operating efficiency. The isolation member 28 can also be configured to reduce stress concentrations and to increase fatigue resistance. Additionally, the isolation member 28 can provide for a mounting system that can reduce relative motions between component parts, as described above.

As various changes could be made in the above-described horn and horn assembly without departing from the scope of the invention, it is intended that all matter contained in the above description be interpreted as illustrative and not in a limiting sense.

What is claimed is:

1. A method for manufacturing an ultrasonic horn, said method comprising:
    forming metal powder into a horn body preform within a preform mold; and
    hot isostatically pressing said horn body preform to consolidate said metal powder to form a compressed horn preform shape having a uniform isotropic microstructure characterized by randomly isotropic directional grain alignment, wherein said ultrasonic horn includes a first material and a second material and said first material is said metal powder and said second material is said preform mold.

2. The method of claim 1 wherein said second material is at least a portion of an isolation member adapted for mounting said ultrasonic horn at a work location.

3. The method of claim 2 wherein said isolation member provides a component of flexure along a radial direction and a component of flexure along said axial direction.

4. The method of claim 2 wherein said isolation member has a radial isolation submember integrally joined to said axle member and extending in said radial direction from said axle member an axial isolation submember integrally joined to said radial isolation submember and extending in said axial direction from said radial isolation submember.

5. The method of claim 4 wherein said radial isolation submember is substantially disk-shaped.

6. The method of claim 4 wherein said radial isolation submember is at least partly said first material.

7. The method of claim 4 wherein said axial isolation submember is at least partly said second material.

8. The method of claim 4 wherein said isolation member further comprises a mixture zone, said mixture zone comprising said first material intermixed with said second material.

9. The method of claim 8 wherein said mixture zone is disposed proximate said axle member.

10. The method of claim 1 wherein said first material transports ultrasonic energy at least 200 percent more efficiently than said second material.

11. The method of claim 1 wherein said first material transports ultrasonic energy at least 500 percent more efficiently than said second material.

* * * * *